United States Patent [19]

Bernhard et al.

[11] 4,084,983

[45] Apr. 18, 1978

[54] DYED LUSTROUS PIGMENTS

[75] Inventors: Horst Bernhard; Kurt Marquard, both of Darmstadt, Germany

[73] Assignee: Merck Patent Gesellschaft mit beschrankter Haftung, Darmstadt, Germany

[21] Appl. No.: 588,504

[22] Filed: Jun. 19, 1975

[30] Foreign Application Priority Data

Jun. 21, 1974 Germany .............................. 2429762

[51] Int. Cl.$^2$ ...................... C04B 31/38; C04B 31/00; B05D 7/00
[52] U.S. Cl. ..................................... 106/289; 427/214; 427/220; 427/399; 106/291; 106/308 Q; 106/308 N
[58] Field of Search ............... 427/220, 215, 301, 343, 427/214; 106/289, 308 Q, 308 N; 427/214

[56] References Cited

U.S. PATENT DOCUMENTS

| 2,053,208 | 9/1936 | Curtis | 106/289 |
| 2,772,984 | 12/1956 | Helfaer | 106/289 |
| 2,935,481 | 5/1960 | Hochwalt | 106/308 Q |
| 2,984,635 | 5/1961 | Harris | 106/289 |
| 3,036,059 | 5/1962 | Ehrhardt et al. | 106/289 |
| 3,087,828 | 4/1963 | Linton | 106/291 |
| 3,477,866 | 11/1969 | Remer | 106/289 |
| 3,632,395 | 1/1972 | Dyson | 106/289 |
| 3,711,308 | 1/1973 | Brand et al. | 106/291 |
| 3,716,388 | 2/1973 | Lopez et al | 106/308 Q |
| 3,917,887 | 11/1975 | Stiller | 427/343 |

FOREIGN PATENT DOCUMENTS

| 9,674 of | 1905 | United Kingdom | 106/289 |
| 1,000,531 | 8/1965 | United Kingdom | 106/289 |

Primary Examiner—Ronald H. Smith
Assistant Examiner—Sam Silverberg
Attorney, Agent, or Firm—Millen & White

[57] ABSTRACT

Lustrous pigments having a wide range of colors and especially suitable for the cosmetics industry are produced by forming an aluminum lake on a micaceous pigment coated with aluminum hydroxide.

21 Claims, No Drawings

DYED LUSTROUS PIGMENTS

BACKGROUND OF THE INVENTION

This invention relates to colored lustrous pigments and to processes for producing same.

Colored lustrous pigments are of increasing importance in varied fields, e.g. in cosmetics or as additions to synthetic resins, lacquers and dyes. Because of the growing acceptance of lustrous pigments, there exists the need for new colors for various markets.

Processes are known wherein dyestuffs are added to lustrous pigments during their production so that, besides the colors resulting from interference phenomena, additional color effects can be achieved. Thus, e.g., according to German Pat. No. 2,124,155, dyestuffs are added during the formation of lustrous pigments based on triazines, urazils and basic lead carbonate, thereby being incorporated into the pigment particles. Furthermore, it is known, e.g. according to German (Federal Republic of Germany) Patent No. 1,192,353, that better adhesion of the dyestuffs onto the pigment particles is achieved by producing water-insoluble dyestuffs directly in the suspension which contains the pigment particles, thereby permitting the dyestuff to be deposited in finely-divided form directly upon the pigment particles.

These processes, however, are not satisfactory on a practical scale. For example, only a portion of the dyestuff is fixed onto the pigment particles, and the main amount of the dyestuff instead of precipitating out on the pigment particles, is found in suspension. The dyestuff can also be easily washed off of the pigments with water. Furthermore, in most cases, a non-uniform distribution of the dyestuff on the pigment surface is observed, whereby the properties of the final products, especially their gloss, are strongly impaired.

SUMMARY OF THE INVENTION

One object of the present invention is to provide improved colored lustrous pigments having special color effects. This object is attained by binding the dyestuff primarily chemically on the surface of the pigment particles. This is possible by coating the starting material with a substance which is convertible into a color lake. In this way, there are obtained colored lustrous pigments with a firmly adhering dyestuff coating which cannot be washed out, the resultant pigments possessing outstanding color and brilliance. Additionally, there are obtained metallic color effects not achievable with the prior lustrous pigments.

A particular object of the invention is to provide lustrous pigments based on mica flakes coated with metal oxides, and which contain aluminum lakes fixed on the surface of the pigment particles by a previously precipitated aluminum hydroxide layer. The pigments preferably contain the lakes in an amount of about 0.001 to 5 wt. percent.

A further object is to provide a process for the production of dyestuff-containing lustrous pigments based on mica flakes coated with metal oxides, which process comprises reacting lustrous pigments coated with an aluminum hydroxide layer with a solution of a hydroxyl group-containing compound which, directly or with intermediate formation of a sparingly soluble aluminum chelate and subsequent reaction thereof with a diazotized amine, is able to form a water-insoluble aluminum lake. Preferably, the process comprises the following alternatives: (A) the lustrous pigments are reacted with an aqueous solution of an organic, hydroxyl-group-containing dyestuff which forms a sparingly soluble salt or complex with Al ions; or (B) the lustrous pigments are admixed with an aqueous solution of a chelate former which forms, with Al ions, a sparingly-soluble precipitate on the pigment particles, and this precipitate is then converted by a conventional coupling reaction with a diazotized amine, into an aluminum color lake.

Upon further study of the specification and appended claims, further objects and advantages of this invention will become apparent to those skilled in the art.

DETAILED DISCUSSION

The novel pigments of this invention can be produced from all mica flake pigments. Thus, as the starting material, there can be used not only mica flakes themselves but also those which are also coated with uniform metal oxide layers. Such pigments are commercially available and are described, e.g. in German Patent No. 2,009,566. Generally, the mica flakes have a diameter of about 5 – 200 microns and a thickness between 0.1 and 5 microns, preferably about 0.5 microns.

As metal oxide coatings, there are mainly used, because of their advantageous refractive indices, titanium dioxide or titanium dioxide hydrate and/or zirconium dioxide or zirconium dioxide hydrate. An especially advantageous pigment comprises mica flakes having a diameter of about 5 to 50 microns and a thickness of about 0.5 microns and uniformly coated with an optionally hydrated titanium dioxide layer, the mica surface containing about 50 to 500 mg. $TiO_2/m^2$. These known nacreous pigments exhibit a variety of colors depending upon the thickness of the precipitated $TiO_2$ and/or $ZrO_2$ layers. Normally, the products are calcined. In principle, however, there can, of course, be employed all other pigments based on coated mica flakes, especially also those having different layer thicknesses of $TiO_2$ and/or $ZrO_2$. These starting materials include all lustrous pigments containing coloring metal oxides in the layers present on the mica flakes, e.g. of iron, nickel, cobalt, chromium or vanadium. These layers can optionally contain non-coloring metal oxides as well, such as aluminum oxide or antimony oxide. These pigments are known and described, for example, in German Patent Nos. 1,467,468 and 1,959,998, in German published Patent Specification No. 2,244,298. See also U.S. Pat. No. 3,553,001 and U.S. Pat. No. 3,711,308 and references cited therein for examples of suitable starting materials, noting that in U.S. Pat. No. 3,087,838, Examples VIII and IX indicate the use of a coating of hydrous aluminum oxide onto $TiO_2$-coated mica flake pigments to improve light stability.

A firmly adhering coating of aluminum hydroxide is first applied to these pigments, the aluminum ions contained therein are then reacted in order to form a firmly adhering dyestuff layer.

For applying the coating of aluminum hydroxides onto lustrous pigments based on mica flakes coated with metal oxides, the pigment particles are suspended in water and this suspension is advantageously heated to higher temperatures, for example, between 40° and 95° C. Into the suspension is then passed an aqueous acidic solution of a water-soluble aluminum salt, e.g. aluminum chloride, aluminum nitrate, potassium aluminum sulfate or aluminum sulfate, or an aqueous alkaline solution of an aluminate, e.g. sodium aluminate or potassium aluminate, said solution having a concentration of Al ion of 0.1 – 5 mol./l. Simultaneously, alkali or acid is added in order to adjust the suspension to a pH value between 3 and 10, preferably between 4 and 9. As alkali, it is advantageous to employ hydroxides of alkali metals as well as ammonium hydroxide, preferably aqueous NaOH or gaseous $NH_3$. In the case of acid addition, it is preferred to use HCl, $H_2SO_4$ or $HNO_3$.

The addition of the alkali or of the acid is so regulated that the pH of the suspension remains as constant as possible during the precipitation. After the precipitation of the desired amount of aluminum hydroxide, the pigment obtained is vacuum filtered, washed and dried. It has proved to be favorable to adjust the precipitated amount of aluminum hydroxide to about 0.1 to 20 wt. % of $Al_2O_3$ in the finished pigment, preferably to about 1 to 10 wt. %. This corresponds to a thickness of the aluminum oxide hydrate or hydroxide layer of about 1 to 100 nm, preferably 5 to 45 nm.

Isolation and drying of the so coated pigment is, in many cases, not necessary. To the contrary, it is advantageous that the suspension of the coated pigment particles obtained from the aluminum hydroxide precipitation can be used directly in the subsequent step of producing the color lake.

The resultant aluminum hydroxide layer on the pigment particles is smooth and uniform so that the gloss and intensity of the final colored pigments is maximized. In contradistinction to the direct coating method with organic dyestuffs, another advantage of the present invention is that undesired precipitates and agglomerates of dyestuffs are avoided.

The substrate layer of aluminum hydroxide permits the pigment particles to be dyed in a further step, whereby the important property of the dyestuff to be used is that it must form a lake with the aluminum ions. As is known, according to definition, color lakes are dyestuffs which are obtained by precipitation of a water-soluble organic dyestuff with precipitating agents, especially metal ions (here e.g., aluminum ions). Thus, from the numerous available dyestuffs, a suitable selection can be made. Numerous Al color lakes are described in the literature; furthermore, many organic compounds are known to one skilled in the art which are capable of forming color lakes with aluminum. Consequently, the present invention is not intended to be limited to the application of presently known Al color lakes, but instead, the process according to this invention can be, without difficulty, used with a plurality of dyestuffs, including but not limited to foodstuff dye as well as cosmetic colors.

The formation of the color lakes on the pigment particles coated with aluminum hydroxide can take place in various ways. As the inorganic component of the color lake there is utilized the Al-ion content of the aluminum hydroxide layer. The organic component required for the formation of the color lake is a dyestuff molecule containing groups which permit either the formation of a sparingly soluble salt or of a sparingly soluble complex compound with aluminum ions. According to the invention, those molecules are preferred which are able to form true complex compounds with aluminum ions because such complex compounds generally possess greater chemical stability than simple salts. Molecules of this type suitable for complex formation are e.g. those already widely used in analytical chemistry as metal indicators or as precipitating reagents. (They are also known in dyeing technology as mordant dyestuffs.) Especially advantageous dyestuffs are those with chelateforming groups, e.g. dyestuffs based on anthraquinone, especially the alizarin complex compounds known for the production of madder lakes.

In the dyestuffs with salt-forming groups, the number of the salt-forming groups must, on the one hand, be so great that the dyestuff can initially be kept in aqueous solution but, on the other hand, also so small that, after the reaction with the pigment particles, a sparingly-soluble salt is formed which cannot be washed out. Consequently, the number of the salt-forming groups plays a part in the relationship to the size and form of the organic molecule. In principle, these reaction ways are familiar to one skilled in the art and, in case of doubt, a routine experiment suffices to ascertain whether a particular dyestuff forms a sparingly soluble color lake with aluminum ions.

In such a routine experiment, the solubility of the dyestuff is determined under normal pressure and at a temperature of 22° C. If the solubility is less than 1 g per liter water, the dyestuff considered to be sparingly soluble and is appropriate to be used for the pigments of this invention.

The formation of the color lake can take place in two ways:

METHOD A

The pigment particles coated with aluminum hydroxide are slurried in water. A solution of the selected organic dyestuff is slowly added thereto and the suspension is heated. The dyestuff thereby reacts with the aluminum hydroxide on the pigment particles, with the formation of a color lake onto the pigment particles. To vary the depth of the color the concentration of the dyestuff solution is a very important parameter and the pH of the suspension and the reaction temperature also have an effect.

METHOD B

The pigment coated with aluminum hydroxide is brought to reaction in aqueous suspension with an organic compound which is able to form a sparingly precipitate with aluminum ions. As the organic compound chelate formers are preferred, e.g. hydroxyquinolines. The layer formed in this manner of a sparingly soluble Al chelate now permits, by coupling e.g. with diazotized amines of the most varied type, dyestuffs to be fixed on the pigment particles. For this purpose, the diazotized amines are preferably dosed into the aqueous pigment suspension. The dyestuff forming in per se known manner by coupling is firmly fixed on the pigment particles and forms a dyestuff layer which cannot be washed out.

This Method B opens up the most varied possibilities for the formation of the color lakes since, as is known from the literature, the number of dyestuffs producible via a diazotization and coupling is virtually unlimited. The layer adhering to the pigment particles and bound with the aluminum ions to a firm chelate complex is thus the starting point for a plurality of dyestuff-containing pigments.

In the case of Method A, the concentration of the dyestuff solutions which are supplied to the pigment particles coated with aluminum hydroxide and present in suspension generally lies approximately between 0.001 and 5 wt. %, preferably between 1 and 3 wt. %. It is to be understood, however, that depending upon the desired color depth, quite different amounts of dyestuffs can, of course, be added thereto, especially since the amount of dyestuff fixed on the pigment particles with the help of the aluminum hydroxide layer is dependent upon the molecular weight of the dyestuff in question.

The following individual dyestuffs useful in this invention is not intended as a complete list of all possible chelate-forming configurations. Instead, the purpose of the following discussion is to elucidate the mechanism of the process according to this invention by illustrative examples, and it is not to represent a limitation with regard to other dyestuffs which are not specifically mentioned. It is well known to one skilled in the art which other dyestuffs can be employed in order to obtain the benefits of this invention. The division of the dyestuffs into individual groups is also not to represent a limitation. Furthermore, it is self-evident that a particular dyestuff can also belong simultaneously to several groups, e.g. when, besides chelate-forming, also salt-forming parts of the molecule are present.

1. dyestuffs with chelate-forming groups
1.1 dyestuffs based on anthraquinone
1.1.1 OH groups neighboring the CO group The group in the molecule that accomplishes complex formations is:

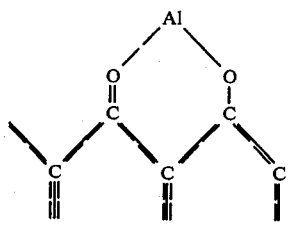

To these belong the alizarin complex compounds known for the production of the madder lakes, which are especially well suited. By way of example, these include:

1,2-dihydroxyanthraquinone-3-sulphonic acid (Alizarin S)
    1,2,5,8-tetrahydroanthraquinone carminic acid
    1,2,6-trihydroxyanthraquinone-3-sulphonic acid
    1,4-dihydroxy-2-anthraquinone-sulphonic acid
    1,2-dihydroxyanthraquinone
    1,2,3-trihydroxyanthraquinone
    1,2,4-trihydroxyanthraquinone
    1,2,5-trihydroxyanthraquinone
    1,2,6-trihydroxyanthraquinone
    1,2,7-trihydroxyanthraquinone
    1,2,4,5,8-pentahydroxyanthraquinone
    1,2,4,5,7,8-hexahydroxyanthraquinone
    3-nitro-1,2-dihydroxyanthraquinone
    4-amino-1,2-dihydroxyanthraquinone
    3-amino-1,2,4-trihydroxyanthraquinone
    4-nitro-1,2-dihydroxyanthraquinone
    1-salicylaminoanthraquinone
    dibenzoyl-1,5-diaminoanthraquinone
    dibenzoyl-1,8-diaminoanthraquinone
    [(1,4-dihydroxy-2-anthraquinoyl)-methyl]-iminodiacetic acid
    [(3,4-dihydroxy-2-anthraquinonyl)-methyl]-iminodiacetic acid (alizarin complexan)

1.1.2 Amino groups neighboring a CO group Complex formation takes place as follows:

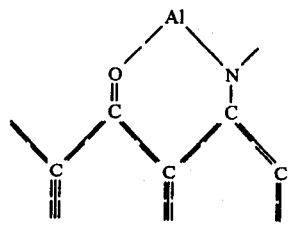

To these belong e.g.: 1,4-di-(4'-methyl-2'-sulphophenylamino)-anthraquinone 1.2 Azo compounds with neighboring hydroxyl groups
Complex formation can take place between a diazo group and a neighboring hydroxyl group:

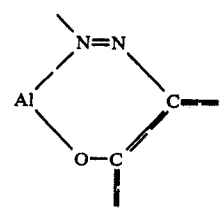

The following monoazo dyestuffs are suitable:
1-(2-sulpho-4-methyl-1-phenylazo)-2-naphthol-3-carboxylic acid (Litholrubin BK)
1-(2-sulpho-4-methyl-5-chloro-1-phenylazo)-2-hydroxynaphthalene-3-carboxylic acid (Litholrubin 3R)
1-(3-sulpho-1-phenylazo)-2-naphthol-6-sulphonic acid (Orange GGN)
1-(2-sulphonic acid-4-chloro-5-carboxylic acid-1-phenylazo)-2-hydroxynaphthalene (permanent red toner NCR)
1-(4-sulpho-1-phenylazo)-2-napthol-6-sulphonic acid (yellow-orange S)
4-(4-sulpho-1-phenylazo)-1-(4-sulphophenyl)-5-hydroxypyrazolone-3-carboxylic acid (tartrazine)
2,4-dihydroxy-azobenzene-4'-sulphonic acid (chrysoin S)
1-(2-sulpho-1-naphthylazo)-2-hydroxynaphthalene-3-carboxylic acid (Lithol bordeaux toner R)
1-(4-sulpho-1-naphthylazo)-2-naphthol-3,6-disulphonic acid (amaranth)
2-(4-sulpho-1-naphthylazo)-naphthol-4-sulphonic acid (azombin)
1-(4-sulpho-1-naphthylazo)-2-naphthol-6,8-disulphonic acid (cochineal red A)
1-(6-hydroxy-m-toloylazo)-2-naphthol-4-sulphonic acid (calmagite)
bis-[3-(8-amino-1-hydroxy-3,6-disulpho-2-naphthylazo)-4-hydroxyphenyl]-sulphone (sulphonazo)
3-hydroxy-4-(2-hydroxy-4-sulpho-1-naphthylazo)-2-naphthoic acid (calcone carboxylic acid)
4-(2-pyridylazo)-resorcinol (PAR)
1-(2-hydroxy-1-naphthylazo)-2-naphthol-4-sulphonic acid (calcone)
3-(5-chloro-2-hydroxyphenylazo)-4,5-dihydroxy-2,7-naphthalene-disulphonic acid (eriochrome blue SE)
1-(2,4-dimethyl-1-phenylazo)-3,6-disulpho-2-naphthol (Ponceau R)

1-(1-hydroxy-2-naphthylazo)-6-nitro-2-naphthol-4-sulphonic acid (Erio T) Also suitable are the disazo dyestuffs:

[4'-(4''-sulpho-1''-phenylazo)-7'-sulpho-1'-naphthylazo]-1-hydroxy-8-acetylaminonaphthalene-3,5-disulphonic acid (brilliant black BN)

2-[4'-(4''-sulpho-1''-phenylazo)-7'-sulpho-1'-naphthylazo]-1-hydroxy-7-aminonaphthalene-3,6-disulphonic acid (Black 7984).

1.3 Dyestuffs with neighboring COOH and CO groups Complex formation takes place with the Al ion, as follows:

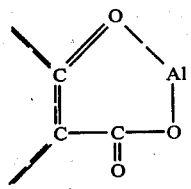

By way of example, these include:
  5-(3,3'-dicarboxy-4,4'-dihydroxybenzohydrylidene)-2-oxo-3,6-cyclohexadiene-1-carboxylic acid (aurin tricarboxylic acid)
  5-[α-(3-carboxy-5-methyl-4-oxo-2,5-cyclohexadien-1-ylidene)-2,6-dichloro-3-sulpho-benzyl]-3-methylsalicylic acid (Chromazurol S) 5-[α-(3-carboxy-5-methyl-4-oxo-2,5-cyclohexadien-1-ylidene)-2,6-dichlorobenzyl]-3-methyl-salicylic acid (eriochromazurol B)
  5-[α-(3-carboxy-5-methyl-4-oxo-2,5-cyclohexadien-1-ylidene)-2-sulphobenzyl]-3-methyl-salicylic acid (eriochromcyanin R)
  5-[3-carboxy-α-(3-carboxy-5-methyl-4-oxo-2,5-cyclohexadien-1-ylidene)-4-hydroxy-2,6-dimethylbenzyl]-3-methyl-salicylic acid (chromoxan violet 5 B)

1.4 Dyestuffs with neighboring OH and CO groups Complex formation is as follows:

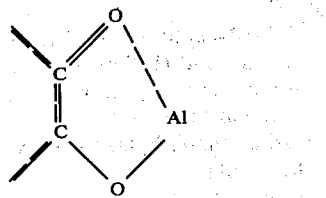

Examples are:
  pyrocatechol sulphonphthalein (pyrocatechol violet)
  o-(4,5,6-trihydroxy-3-oxo-3-H-xanthen-9-yl)-benzenesulphonic acid (pyrogallol red)
  o-(2,7-dibromo-4,5,6-trihydroxy-3-oxo-3-H-xanthen-9-yl)-benzene-sulphonic acid (bromopyrogallol red)
  o-(2,6,7-trihydroxy-3-oxo-3-H-xanthen-9-yl)-benzene-sulphonic acid (hydroxyhydroquinone pink)
  4',5'-dihydroxyfluorescein (gallein)
  2',7'-tetrahydroxyfluorescein (hydroxyhydroquinonephthalein)
  3'-hydroxyphenolphthalein (pyrocatechol blue)

1.5 Dyestuffs with an aminoacetic acid grouping Complex formation takes place as follows:

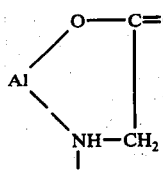

The following dyestuffs are mentioned by way of example:
  2',7'-bis-((bis-carboxymethyl)-amino)-methyl)fluorescein (calcein)
  3',3''-bis-((bis-(carboxymethyl)-amino)-methyl)-5',5''-diisopropyl-2',2''-dimethylphenolsulphonphthalein (methyl thymol blue)
  3',3''-bis-((bis-(carboxymethyl)-amino)-methyl)-5',5''-dimethylphenolsulphonphthalein (xylenol orange)
  3',3''-bis-((bis-(carboxymethyl)-amino)-methyl)-5',5''-dimethylphenolsulphonphthalein (glycine cresol red)
  3',3''-bis-((bis-(carboxymethyl)-amino)-methyl)-phenolphthalein (phenolphthalexone)
  3',3''-bis-((bis-(carboxymethyl)-amino)-methyl)-5',5''-dimethylphenolphthalein (cresolphthalexone)
  3',3''-bis-((bis-(carboxymethyl)-amino)-methyl)-5',5''-diisopropyl-2',2''-dimethylphenolsulphonphthalein (glycine thymol blue)
  3',3''-bis-((bis-(carboxymethyl)-amino)-methyl)-5',5''-diisopropyl-2',2''-dimethylphenolphthalein (thymolphthalexone)

1.6 Dyestuffs forming a complex as follows:

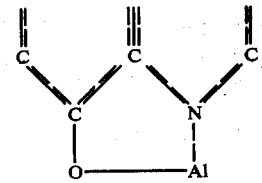

One example is:
  α-(8-hydroxy-5-quinolyl)-α-(4-oxo-2,5-cyclohexadien-1-ylidene-)-o-toloylic acid (oxine blue)

2. Dyestuffs with salt-forming groups (without chelate formation)
Suitable are e.g.:
  N,N-diphenylrosaniline-monosulphonic acid)) (alkali blue)
  N,N-triphenylrosaniline-monosulphonic acid)
  quinophthalone-disulphonic acid (quinoline yellow)
  indigo-disulphonic acid
  2,4-disulpho-5-hydroxy-4,4'-bis-(diethylamino)-triphenyl-carbinol (Patent Blue V)
  N,N-diethyl-N,N'-disulphobenzyl-di-4-amino-2-chloro-di-2-methyl-fuchsonimonium (acilanechtgrun 10 G)
  4'-(N-ethyl-N-m-sulphobenzyl)-amino-4'')-N-dimethyl)amino-N-ethyl-N-m-sulphobenzyl-fuchsonimonium tetrabromo-dichloro-fluorescein (phloxin)
  2,4,5,7-tetraiodofluorescein (erythrosin bluish)

For the formation of the Al color lakes there are also suitable the so-called eloxal dyes, which are used for the coloring of eloxalated aluminum. As a rule, these are colored, organic metal complexes, especially chromium or copper complexes. Generally, they are dyestuffs characterized by a special stability and light fastness. By way of example, there are here mentioned the chromium complexes of Zaponechtgelb G (N-(o-hydroxybenzylidene)-2-hydroxy-3-sulpho-5-nitrophenylamine), Palatinechtorange GN (4-(3'-nitro-5'-sulpho-6'-hydroxy-1'-phenylazo)-1-phenyl-3-methyl-5-hydroxypyrazole), Palatinechtrot BEN, Palatinechtschwarz WAN (2-(2-hydroxy-4-sulpho-6-nitro-1-naphthylazo)-2-naphthol and e.g. Heliogenblau SBL (copper phthalocyanine-sulphonic acid).

The Al chelate precipitate to be formed according to Method B is also produced from solutions which are added to the Al(OH)$_3$-coated pigment particles present in suspension. Chelate formers are e.g. 2,4- or 2,6-dihydroxybenzoic acid, 8-hydroxyquinoline and gallic acid. However, other compounds can also be employed which form, wil. Al ions, chelates which are sparingly soluble in water.

The routine test to find out whether a sparingly-soluble chelate is formed is just the same as the description on page 7, lines 18 – 22.

For conducting Method B, the pigment coated with aluminum hydroxide is mixed with a solution of the complex former and generally boiled or at least brought to an elevated temperature (<30° C.) at a pH value suitable for the complex formation, which normally lies approximately between 3 and 10. The chelate is usually formed within about 5–30 minutes. The addition of a conventional buffer solution, e.g. acetate or glycine buffer, is also frequently recommendable. The so treated pigment is filtered off and washed with water or also with buffer solution and then subsequently with water. In some cases, it is also favorable to add the complex formers in alcoholic solution; in this case, one should expediently also wash with alcoholic-aqueous solution or alcohol.

The so obtained washed chelate containing pigment is then reacted in aqueous suspension with a diazotized amine. The reaction normally takes place at room temperature and in a substantially neutral medium. In principle, the usual standard processes for coupling reactions for the production of azo dyestuffs are useable, reference being directed for example to Houben-Weyl, Methoden der Organischen Chemie (Methods of Organic Chemistry), Georg Thieme Verlag Stuttgart 1965, Volume 10/3, pages 1 – 626.

In principle, all amines suitable for the formation of azo dyestuffs can be employed. Preferred are primary aromatic amines, especially those which additionally contain sulphonic and/or carboxylic acid groups. From the vast number of these compounds, there are here mentioned, only by way of example:

aniline
naphthylamine
2-aminobenzoic acid
sulphanilic acid
4-aminonaphthalene-sulphonic acid-(1)
4-amino-2-hydroxybenzoic acid
4-amino-5-hydroxy-naphthalene-disulphonic acid-(2,7)
4-amino-3-hydroxynaphthalene-sulphonic acid-(1)
6-amino-5-hydroxynaphthalene-sulphonic acid-(1)
1-amino-4-hydroxyanthraquinone The colored pigment particles are, in all cases, separated from the suspension, repeatedly washed with water, possibly also with alcohol, and then dried, expediently at temperatures of about 120° C. at normal pressure or at appropriately lower temperatures under vacuum.

By coloring the pigments containing a base layer of aluminum hydroxide with the selected dyestuff, agglomeration is excluded, since once the Al ion sites are saturated, no more precipitation takes place, which could otherwise bring about a sticking of the pigment particles. Therefore, the process according to the invention leads, in all cases, to strongly-colored, highly glossy pigments. The new process is thereby far superior to the known methods. Precisely those pigments based on mica flakes and coated with metal oxides tend very frequently to agglomeration, especially when organic dyestuffs are precipitated out in their presence. Gloss and color power thereby decrease considerably. The agglomerated particles are thereby coated with dyestuff and thus stick. A subsequent separation is no longer possible. Therefore, the dyeing of such pigments according to the known process is only possible to a limited extent.

All pigments produced by this invention can be employed in the same way as prior art pigments: "plastics", protective and decorative coatings such as paint, enamel and lacquer, and with cosmetics, the latter being a particularly active field. Here, the new lustrous pigments are, as a rule, added in amounts of between 0.1 and 80 wt. %. Forms of compositions are e.g. powders, salves and wax pencils, e.g. eye shadow pencils (pigment content about 5 to 15%), eye shadow powder compacts (pigment content about 20 to 70%), liquid compositions for eye shadow and eye makeup (pigment content about 7 to 15%), lipsticks (pigment content about 10 to 20%), lip gloss cream (pigment content about 10 to 15%), make-up in pencil form (pigment content about 15 to 25%), make-up powder compacts (pigment content about 10 to 50%), make-up emulsions (pigment content about 5 to 10%), make-up gel (pigment content about 1 to 5%), sunlight protection emulsions and tanning emulsions (pigment content about 5 to 10%), foam bath concentrates with color gloss (pigment content about 0.1 to 2%), skin care lotions (pigment content about 0.1 to 2%).

The advantage of the pigments of this invention for use in cosmetics is that an outstanding color gloss is produced, such as is desired for many decorative cosmetics. Furthermore, the pigments according to this invention are particularly simple to use as master batches since in one substance, both color and gloss components are combined which otherwise would require the use of separate color and gloss pigments.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

(a) 6 kg. of a mica flake pigment having a silver gloss (platelet size between 10 and 50μ, TiO$_2$ content 28%, mica content 72%) are suspended in 200 l of completely desalinated water and heated, with stirring, to 75° C. An aqueous sodium hydroxide solution is added to obtain a pH of 8. A solution of 850 g. AlCl$_3$.6H$_2$O in 35 l. water is then introduced slowly (rate about 35 l./h.). Simultaneously, a 7.5% aqueous sodium hydroxide solution is introduced so that the pH of 8 is kept constant over the entire reaction period. The suspension is further stirred for an hour, and the pigment is then filtered off and washed with completely desalinated water and dried at 120° C. Content of $Al_2O_3$:2.9 wt.%.

(b) 5 kg. of the resultant pigment produced according to (a) are suspended in 100 l. of a solution buffered to pH 5 with ammonium acetate-acetic acid. The suspension is heated, while stirring, to about 90° C. and subsequently mixed with a solution of 100 g. 1-(2-sulpho-4-methylphenylazo)-2-hydroxynaphthalene-3-carboxylic acid (C-red 12) in 100 l. of completely desalinated water. After about 30 minutes, the product is filtered off and, for the removal of excess dyestuff, is then washed with water and acetone. Drying takes place at 110° C.

The pigment is uniformly coated with the Al color lake and displays a pink lustre with a strong red powder color.

EXAMPLE 2

(a) 60 g. of a lustrous pigment having a blue interference color (platelet size between 10 and 50μ, $TiO_2$ content 50%, mica content 50%) are suspended in 2 l. of completely desalinated water and heated, while stirring, to 75° C. A pH of 5 is obtained by the addition of HCl. 350 ml. of a solution, which contains 50 g. $KAl(SO_4)_2 \cdot 12 H_2O$ per l. of completely desalinated water, is introduced at a rate of 350 ml./h. by the simultaneous addition of 2.5% $NH_4OH$, the pH is maintained constant at 5. The suspension is stirred for about 1 hour, the pigment is filtered off, washed salt-free with water and dried at 120° C. It possesses a firmly adhering layer of aluminum oxide hydrate. Content of $Al_2O_3$:3.1 wt. %.

(b) 5 g. of the pigment obtained according to Example 2(a) are suspended in 100 ml. acetate-buffered solution (pH 4.5). The suspension is heated, while stirring, to about 90° C. A solution of 100 mg. 2-(4'-(4"-sulpho-1"-phenylazo)-7'-sulpho-1'-naphthylazo)-1-hydroxy-7-aminonaphthalene-3,6-disulphonic acid (C-black 7) in 100 ml. completely desalinated water is then added thereto. After about 30 minutes, the product is filtered off, washed with water and acetone to remove excess dyestuff, and dried at 120° C.

The so-obtained pigment coated with the lake displays a deep blue powder color and a luminescent blue interference color which, in color power, is far superior to the starting pigment.

EXAMPLE 3

60 g. of a mica flake pigment, coated with titanium dioxide, and having a red-blue interference color (platelet size between 10 and 50μ, $TiO_2$ content 47%, mica content 53%) are suspended in 2 l. of completely desalinated water and coated with aluminum hydroxide according to Example 1(a). 5 g. of the dried product are suspended in 100 ml. water and heated, while stirring, to about 90° C. A solution of 50 mg. 4'-(N-ethyl-N-m-sulphobenzyl)-amino-4"-(N-dimethyl)amino-N-ethyl-N-m-sulphopenzyl-fuchsonimonium (C-ext-violet 15) in 100 ml. water is then added thereto. After about 30 minutes, the colored pigment is filtered off, and washed with water and acetone to remove excess dyestuff. It displays through the color lake coating, a strong violet powder color and a reddish-violet gloss.

EXAMPLE 4

60 g. of a mica flake pigment, coated with titanium dioxide, having yellow interference color (platelet size between 10 and 50μ, $TiO_2$ content 42%, mica content 58%), are suspended in 2 l. water and coated with aluminum hydroxide according to Example 1(a). 10 g. of this pigment are suspended in 100 ml. acetate-buffered solution of pH 4.5. To this suspension is added a solution of 0.01 mol of the sodium salt of 2,6-dihydroxybenzoic acid in a small amount of water. The mixture is heated for 10 minutes to about 90° C. Subsequently, the so pre-treated pigment is washed several times with water. The product, which possesses a firmly adhering Al-chelate layer, is dried at 110° C.

The so pre-treated pigment is again slurried in acetate-buffered solution having a pH value of 4.5 and mixed at room temperature with an aqueous solution of 0.01 mol diazotized sulphanilic acid. The formation of the azo dyestuff commences rapidly and yields a deep yellow colored pigment, which displays a shimmering gold gloss.

EXAMPLE 5

10 g. of a mica flake pigment having a yellow interference color, coated with aluminum hydroxide according to Example 1 (a), are suspended in 100 ml. acetate-buffered solution having a pH of 4. To this suspension is added a solution of 0.005 mol of the sodium of 2,4-dihydroxybenzoic acid in a small amount of water. The mixture is heated for 20 minutes to about 85° C. The product is thoroughly washed with water, and is then dried at 110° C.

5 g of the so obtained product are again slurried in an acetate-buffered solution of pH 5 and mixed with 10 ml. (0.005 mol) of an aqueous of diazotized 2-aminobenzoic acid. The resultant formation of the azo dyestuff yields an orange colored pigment with red-gold lustre.

EXAMPLE 6

10 g. of a $TiO_2$ mica flake pigment, coated with aluminum hydroxide according to Example 1(a), and having a red interference color, are suspended in 100 ml. water. To this suspension is added, with stirring, a solution of 0.001 mol 8-hydroxyquinoline in 15 ml. alcohol. The suspension is adjusted to a pH of 5. The reaction mixture is heated to boiling and kept at this temperature for about 10 minutes. Subsequently, the product is filtered and then washed several times with water and alcohol. Subsequently, it is dried at 110° C.

5 g. of the so obtained product are again suspended in 50 ml. of an acetate-buffered solution having a pH of 4.6 and mixed at room temperature with an aqueous solution of 0.15 g. diazotized aniline. The formed dyestuff adheres firmly to the pigment particles and yields a bright yellow colored pigment having a reddish-yellow interference color.

EXAMPLE 7

Analogous to Example 1(a), a series of mica-titanium dioxide pigments having various interference colors are coated with aluminum hydroxide. 5 g. amounts of the so obtained products are suspended in 100 ml. acetate-buffered water (pH 4.7) and mixed, analogously to Example 1(b), with a solution of 100 mg. of one of the following dyestuffs in 100 ml. of completely desalinated water at the boiling temperature. The pigments coated with dyestuff in this way are worked up as above. Table I lists the lustrous pigments thereby obtained and their powder colors.

Product 1 consists of TiO$_2$-coated mica flakes with a mica content of 51.1% and a TiO$_2$ content of

TABLE I

| Interference color of the lustrous pigment before the dyestuff coating | silvery | yellow | red | violet | blue | green |
|---|---|---|---|---|---|---|
| Dyestuff used for the coating | | | | | | |
| 1-(2-sulpho-4-methyl-1-phenyl-azo)-2-naphthol-3-carboxylic acid (C-red 12) | pink | orange-pink | copper pink | bright violet red | red violet | bright red |
| 2,4,5,7-tetra-iodofluorscein (C-red 38) | bluish pink | bluish pink | blue streaked pink | bluish pink | strong violet pink | bluish pink |
| 1-(4-sulpho-1-naphthylazo)-2-2-naphthol-3,6-disulphonic acid (C-red 46) | soft pink | bright pink lilac | pink lilac | pink lilac | soft lilac | soft lilac |
| 1-(2-sulphonic acid-4-chloro-5-carboxylic acid-1-phenylazo)-2-hydroxynaphthalene (C-red 8) | bright flesh color | pink cream color | bright yellow pink | peach blossom color | blue streaked brick red | strong flesh color |
| 2-(4-sulpho-1-naphylazo)-1-naphthol-4-sulphonic acid (C-red 54) | bright pink | bright pink lilac | coppery bright red | pale pink lilac violet | bluish bright red | pale pink |
| 1-(2-sulpho-4-methyl-5-chloro-1-phenylazo)-2-hydroxynaphthalene-3-carboxylic acid (C-red 13) | bright red | bright red | bright red | streaked bright red | strong red violet | pink bright red |
| quinophthalene-disulphonic acid (C-yellow 11) | bright yellow | bright yellow | reddish bright yellow | red yellow | strong yellow | strong yellow |
| diethyl-disulphobenzyl-di-4-amino-2-chloro-di-2-methyl-fuchsonimonium (-green 3) | pale pale green | pale yellow green dark | yellow green dark | bright green | blue green violet | green |
| 1,4-di-(4'-methyl-2'-sulphophenyl-amino)-anthraquinone (C-green 11) | blue green | blue green | blue green | grey green | streaked blue green | green |
| chlorophyll (C-green 8) | blue green | blue green | dark blue green | grey green | strong blue green | blue |
| indigo-di-sulphonic acid (C-blue 19) | bright blue | green streaked bright blue | red streaked bright blue | violet streaked bright blue | green violet streaked bright blue | green bright green |
| 4'-(N-ethyl-N-m-sulphobenzyl)-amino-4"-(N-di-methyl)-amino-N-ethyl-N-m-sulphobenzylfuch-sonimonium (C-violet 10) | blue lilac | violet streaked bright | violet blue | strong violet blue | violet streaked dark blue | dark blue |
| 4'-(4"-sulpho-1"-phenylazo)-7'-sulpho-1'-naphthylazo)-1-hydroxy-8-acetylamino-naphthalene-3,5-disulphonic acid (C-black 6) | bluish pigeon grey | blue gold shimmering violet grey | violet | violet | lilac blue | green blue |
| 2-(4'-(4"-sulpho-1"-phenylazo)-7'-sulpho-1'-naphthylazo)-1-hydroxy-7-aminonaphthalene-3,6-disulphonic acid C-black 7) | grey | grey green | reddish grey | grey violet | dark blue | grey green |

EXAMPLE 8

Analogously to Example 7, 2 commercially available lustrous pigments which, besides mica and TiO$_2$, also contain Fe$_2$O$_3$ and display a strong golden powder color, are coated with dyestuff. Both pigments display a strong yellow interference color.

44.4%, which are coated on their surface with 4.5% Fe$_2$O$_3$.

Product 2 consists of 56% mica flakes, which are coated with a mixture of 42% TiO$_2$ and 2% Fe$_2$O$_3$.

Both pigments are coated with aluminum hydroxide analogously to Example 7 and colored with various dyestuffs. Table II gives a survey of the lustrous pigments thereby obtained and of their powder colors.

TABLE II

| DYESTUFF | PRODUCT 1 | PRODUCT 2 |
|---|---|---|
| 1-(2-sulpho-4-methyl-1-phenylazo)-2-naphthol-3-carboxylic acid (C-red 12) | deep gold orange | pink-streaked red gold |
| 2,4,5,7-tetraiodo-fluorescein (C-red 38) | dark gold orange | gold pink |
| 1-(4-sulpho-1-naphthylazo)-2-naphthol-3,6-di-sulphonic acid (C-red 46) | gold ochre | brown pink |
| 1-(2-sulphonic acid-4-chloro-5-carboxylic acid-1-phenylazo)-2-hydroxy-naphthalene (C-red 8) | ochre | gold brown |
| 2-(4-sulpho-1-naphthylazo)-1-naphthol-4-sulphonic acid (C-red 54) | gold ochre | brownish pink |
| 1-(2-sulpho-4-methyl-5-chloro-1-phenylazo)-2-hydroxynaphthalene-3-carboxylic acid (C-red 13) | gold ochre | brownish pink |
| diethyl-disulphobenzyl-di-4-amino-2-chloro-di-2-methylfuchsonimonium (C-green 3) | greenish gold | greenish yellow |
| 1,4-di-(4'-methyl-2'-sulphophenylamino)-anthraquinone (C-green 11) | olive green | olive green |

TABLE II-continued

| DYESTUFF | PRODUCT 1 | PRODUCT 2 |
|---|---|---|
| chlorophyll copper complex (C-green 8) | olive green | olive green |
| indigo-disulphonic acid (C-blue 19) | olive green | bright olive green |
| 4'-(N-ethyl-N-m-sulphobenzyl)-amino-4"-(N-dimethyl)-amino-N-ethyl-N-m-sulphobenzyl-fuchsonimonium (C-violte 10) | deep black violet | black violet |
| (4'-(4"-sulpho-1"-phenylazo)-7'-sulpho-1'-naphthylazo) 1-hydroxy-8-acetyl-amino-naphthalene-3,5-di-sulphonic acid (C-black 6) | bronze colored | gold shimmering violet grey |
| 2-(4'-(4"-sulpho-1"-phenylazo)-7'-sulpho-1'-naphthylazo)-1-hydroxy-7-aminonaphthalene-3,6-disulphonic acid (C-black 7) | brass colored | yellow |
| quinaphthalone-disulphonic (C-yellow 11) | ochre | bright ochre |

The preceding examples can be repeated with similar success by substituting the generically or specifically described reactants and/or operation conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a colored lustrous pigment composition comprising translucent micaceous flakes coated with a dyestuff, the improvement wherein said dyestuff is an aluminum lake fixed onto the surface of the micaceous pigment by a smooth and uniform intermediate coating of aluminum hydroxide, the aluminum of said aluminum hydroxide being a chemically bound portion of said aluminum lake, the pigment composition being substantially devoid of agglomerated flakes and being substantially color fast.

2. A colored pigment composition according to claim 1, wherein said aluminum lake is present in a concentration of 0.001 – 5% by weight of the total composition.

3. A pigment composition according to claim 1, wherein interposed between said coating of aluminum hydroxide and micaceous flakes is a coating of a metal oxide selected from the group consisting of titanium dioxide, zirconium oxide and mixtures thereof.

4. A pigment composition according to claim 1, wherein said aluminum lake is a madder dye.

5. A pigment composition according to claim 1, wherein said aluminum hydroxide coating has a thickness of 1 – 100 nm.

6. A pigment composition according to claim 1, wherein said aluminum lake is formed from an azo dye.

7. A pigment composition comprising a micaceous pigment coated with a chelation compound of aluminum, said chelation compound having a solubility at 22° C. of less than 1 g. per liter of water and being capable of being reacted with a diazotized amine to form an azo dyestuff, wherein interposed between said chelation compound and said micaceous pigment is a smooth and uniform coating of aluminum hydroxide, the aluminum of said hydroxide being a part of said chelation compound.

8. A process for the production of the pigment composition of claim 1, comprising reacting translucent micaceous flakes coated with aluminum hydroxide with an aqueous solution of an organic hydroxyl group-containing dyestuff capable of forming an aluminum lake with aluminum ions.

9. A process according to claim 8, wherein said dyestuff forms a salt with aluminum ions.

10. A process according to claim 8, wherein interposed between said coating of aluminum hydroxide and micaceous flakes is a coating of a metal oxide selected from the group consisting of titanium dioxide, zirconium oxide and mixtures thereof.

11. A process for the production of the pigment composition of claim 1, comprising reacting translucent micaceous flakes coated with aluminum hydroxide with a solution of a chelate former which forms a precipitate with aluminum ions said precipitate having a solubility at 22° C. of less than 1 g. per liter of water, thereby forming a bound chelate compound with aluminum ions on said micaceous flakes, and conducting a coupling reaction with diazotized amine and said chelation compound to form said aluminum lake.

12. A process according to claim 11, wherein interposed between said coating of aluminum hydroxide and micaceous flakes is a coating of a metal oxide selected from the group consisting of titanium dioxide, zirconium oxide and mixtures thereof.

13. A pigment composition according to claim 1 wherein said aluminum hydroxide coating is precipitated and deposited on said micaceous flakes while the latter are suspended in water.

14. A pigment composition according to claim 7 wherein said aluminum hydroxide coating is precipitated and deposited on said micaceous flakes while the latter are suspended in water.

15. A pigment composition according to claim 1 wherein said aluminum hydroxide coating has a thickness of 4–45 nm.

16. A pigment composition according to claim 3 wherein said coating of metal oxide is coating of titanium dioxide having sufficient thickness to yield a blue interference color and wherein said dyestuff is an aluminum lake of 2, 4, 5, 7-tetraiodofluorscein, the resulting pigment composition being strong violet pink.

17. A pigment composition according to claim 3 wherein said coating of metal oxide is a coating of titanium dioxide having sufficient thickness to yield a green interference color and wherein said dyestuff is an aluminum lake of chlorophyll, the resulting pigment composition being blue green.

18. A pigment composition according to claim 3 wherein said coating of metal oxide is a coating of titanium dioxide having sufficient thickness to yield a blue interference color and wherein said dyestuff is an aluminum lake of indigo-di-sulphonic acid, the resulting pigment composition being violet streaked light blue.

19. A pigment composition according to claim 3 wherein said coating of metal oxide is a coating of titanium dioxide having sufficient thickness to yield a red interference color and wherein said dyestuff is an aluminum lake of 4'-(4"-sulpho-1"-phenylazo)-7'-sulpho-1'-naphthylaza)-1-hydroxy-8-acetylaminonaphthalene-3,5- disulphonic acid, the resulting pigment composition being violet.

20. A pigment composisiont according to claim 1 wherein interposed between said coating of aluminum hyudroxide and micaceous falkes is coating of titanium dioxide on the micaceous flakes and a coating of ferric oxide on titanium dioxide, yielding a strong yellow interference color, and wherein the dyestuff is an aluminum lake of 2-(4-sulpho-1-naphthylazo)-1-naphthol-4-sulphonic acid, the resultant pigment composition being gold ochre.

21. A pigment composition according to claim 7 further comprising an azo dyestuff bonded to the chelation compound through the reaction of a diazotized amine therewith, the pigment composition being substantially color fast and substantially devoid of agglomerated flakes.

* * * * *